Jan. 1, 1924
R. E. KLIAVIN
NUT LOCK
Filed Nov. 2, 1922
1,479,667
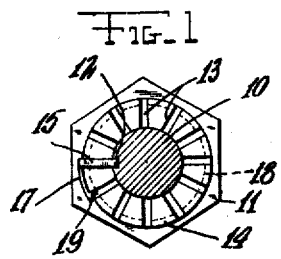
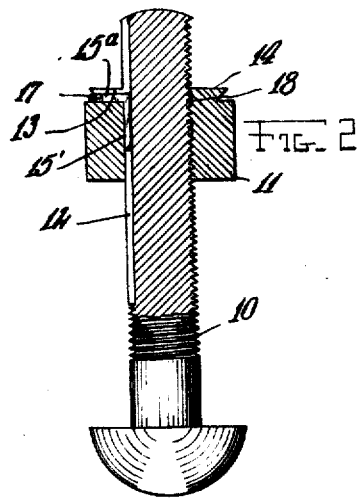
Inventor
Rudolph E. Kliavin
Attorney Patented Jan. 1, 1924.

1,479,667

UNITED STATES PATENT OFFICE.

RUDOLPH E. KLIAVIN, OF SEATTLE, WASHINGTON, ASSIGNOR OF FORTY PER CENT TO KIRIL TOHTIEFF, OF ABERDEEN, WASHINGTON.

NUT LOCK.

Application filed November 2, 1922. Serial No. 598,460.

*To all whom it may concern:*

Be it known that I, RUDOLPH E. KLIAVIN, a citizen of the Republic of Latvia, residing at Seattle, in the county of King and State of Washington, have invented certain new and useful Improvements in Nut Locks, of which the following is a specification.

This invention relates generally to nut-locks, having particular reference to a nut-lock in which the locking is done by means of a key seated in co-operating grooves in the bolt and nut, the invention having for an object to provide an improved and simplified nut lock of this kind, a further object relating specifically to the means for holding the key in place.

For further comprehension of the invention, and of the objects and advantages thereof, reference will be had to the following description and accompanying drawings, and to the appended claims in which the various novel features of the invention are more particularly set forth.

Fig. 1 of the drawings is an end view of a nut and bolt having one embodiment of my improved nut-lock applied thereto.

Fig. 2 is a partial side view and partial longitudinal sectional view thereof.

Fig. 3 is a detail perspective view of the locking key employed.

Referring now to the different figures of the drawing, the bolt is in each case numbered 10 and the nut 11. The general construction of the nut and bolt as regards threading, shape and the like, may be as usual.

In forming my improved nut-lock the bolt 10 is provided with a longitudinal groove 12 extending throughout its threaded portion, while the outer face of the nut 11, or that away from the work being held, is formed with a series of radial grooves 13 which communicate with the hole in the nut. In the embodiment of the invention shown here the outer face of the nut has a flat projection 14 of circular outline in which said radial grooves are formed.

The locking key employed is shown in detail in Fig. 3, being indicated generally by the number 15, this key being of angular form as seen in side view having one arm 15' adapted to engage in the groove 12, in the bolt 10 and an arm 15ª at right angles thereto adapted to engage in one of the radial grooves 13 in the nut 11.

Fixed to the outer end of the arm 15ª is a spring wire 17 curved longitudinally to arcuate shape to lie in an undercut groove 18 the edge of the projection 14, and having on its inner face near its free end a stud 19 adapted to project into one of the grooves 13. As will be apparent, the engagement of the spring 17 in the groove 18 prevents the key from moving outward along the bolt.

Having thus described my invention what I claim as new and desire to protect by Letters Patent of the United States is as follows:

1. In combination, a bolt having a longitudinal groove, a nut having its outer face formed with a radial groove, and having an undercut peripheral recess communicating with said groove, a two-armed key having one arm engaging in the said longitudinal groove and the other arm engaging in the radial groove, and a retaining element for said key adapted to engage in the said recess in the periphery of the nut to prevent axial displacement of the key.

2. In combination, a bolt having a longitudinal groove, a nut having its outer face formed with a radial groove, and having an undercut peripheral recess communicating with said groove, a two-armed key having one arm engaging in the said longitudinal groove and the other arm engaging in the radial groove, and a retaining element for said key adapted to engage in the said recess in the periphery of the nut to prevent axial displacement of the key, said retaining element being in the form of a flat spring secured to the said key.

3. In combination, a bolt having a longitudinal groove, a nut having a circular disk-like projection on its outer face formed with a series of radial grooves, a two-armed key having one arm engaging in said longitudinal groove and the other arm engaging in one of said radial grooves, and a spring element carried by said key and adapted to engage in an undercut groove in the circumferential wall of said projection to hold the key against axial displacement.

In testimony whereof I have affixed my signature.

RUDOLPH E. KLIAVIN.